UNITED STATES PATENT OFFICE.

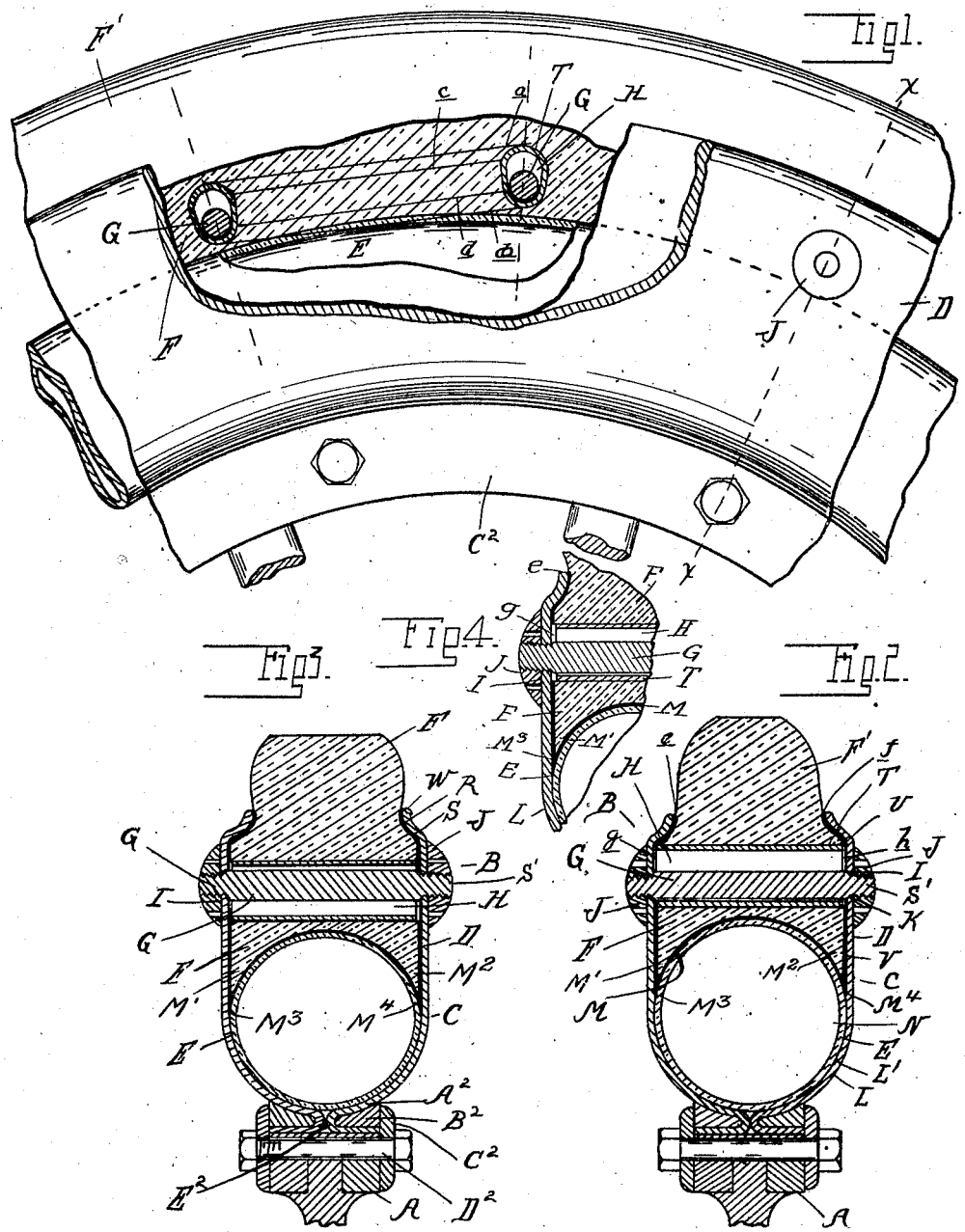

EUGENE W. WILSON, OF DETROIT, MICHIGAN, ASSIGNOR TO DETROIT PNEUMATIC TIRE COMPANY, OF DETROIT, MICHIGAN, A CORPORATION OF MICHIGAN.

TIRE.

1,091,176.      Specification of Letters Patent.      Patented Mar. 24, 1914.

Application filed April 10, 1913. Serial No. 760,239.

*To all whom it may concern:*

Be it known that I, EUGENE W. WILSON, a citizen of the United States of America, residing at Detroit, in the county of Wayne and State of Michigan, have invented certain new and useful Improvements in Tires, of which the following is a specification, reference being had therein to the accompanying drawings.

My invention relates to tires and has among the objects thereof to provide a construction that will have the resiliency of a pneumatic tire but the durability of a solid tire; to provide a structure of such a type that will be comparatively simple and in which the wear between the parts is reduced to a minimum.

Other objects of the invention will more fully hereinafter appear.

To this end the invention resides in the novel construction, arrangement and combination of parts as hereinafter set forth and claimed.

In the drawings,—Figure 1 is a fragmentary side elevation, partly in section, of a wheel embodying my invention; Fig. 2 is a section on the line $x$—$x$ of Fig. 1; Fig. 3 is a similar view showing the parts in a different position of adjustment; and Fig. 4 is an enlarged, fragmentary cross-section showing the parts in the same relation as in Fig. 2.

A designates the felly and B my improved construction of tire. The latter comprises a housing C formed of spaced plates D secured at their inner edges to the felly, a pneumatic tube E positioned in the housing, and a solid tread section F encircling the inner tube and arranged between the plates for a limited radial movement. A portion F' of the section F extends without the plates and forms the tread proper. The outer ends of the plates are connected together by means of a plurality of circumferentially spaced bolts G which pass through slots H in the tread section, elongated to provide for radial movement of the latter.

In order to avoid placing a clamping action upon the sides of the section F the plates are held in fixed spaced relation, preferably by providing the bolts with shoulders I, against which the plates are clamped by means of nuts J engaging the threaded bolt ends S', which project through apertures K in the plates. These clamping bolts also prevent play between the plates.

As shown the base L of the housing has the inner face L' thereof substantially semi-circular and the inner face M of the tread section is also substantially semi-circular, providing a chamber N for the pneumatic tube, normally of circular cross-section. Since when the wheel is in use, there is a relative movement between the faces L' and M, it is necessary to so construct the parts as to have the walls of the chamber N continuous or unbroken in all positions of radial adjustment of the tread section; otherwise, the tube would project at the points where the walls were separated and there would be a tendency to rupture the tube upon a radial movement of the tread section.

With my improved construction the sides of the plates beyond the base are straight, to a point adjacent their outer edges and tangential to the curved surface of the base, and the outer faces of the sides of that portion of the tread section between the plates are parallel to the sides of the latter. The arrangement between the inner face M and the outer face of the section F however, is such as to cause the sides to taper to a comparatively thin edge M'. The tread section is connected to the plates only by the bolts G and therefore, all portions of the tread are free to move as a unit radially within certain limits.

Normally the parts are in the position shown in Fig. 2 but upon a pressure being placed upon the tread section, the latter moves to the position shown in Fig. 3. During the inward radial movement of the tread section, while the cross-section of the chamber N is progressively decreased, the inner wall of this chamber is at all times unbroken, since the flexibility of the tapering edges M² allows these edges to follow the contour of the base. The tread proper is reduced in cross-section over the remainder of the section F, forming shoulders R and the plates adjacent their outer edges are provided with inwardly-extending abutments or stops S which serve to engage the shoulders and limit the outward movement of the tread section. The shoulders R are so proportioned in relation to the slots H that the shoulders will be engaged by the abutments S when the bolts are a very slight distance from the inner end of the slots H. Therefore, outward pressure placed upon the tread section by the pneumatic tube will be transmitted to the shoulders S, eliminating any appreciable pressure being placed upon the bolts G.

Vulcanized in the slot H and of the same contour as the latter are metallic sleeves or linings T, which serve to maintain the shape of the slots, as there would be a tendency to distort the slots of the portion directly receiving the load. The ends U of the sleeves are spaced from the side plates so as not to bind thereupon during vertical movement of the tread.

In order to further reduce the wear between the plates and the tread, a fabric V coated or impregnated with a solid lubricant—preferably soap-stone—is interposed between the plates and the sides of the tread, the fabric being secured to the tread so as to form a unitary part thereof, in any suitable manner. Preferably the fabric extends from a point $e$ adjacent the outer end of one of the plates inwardy to the edge M' then across the face M, around the edge $M^2$ and outwardly to a point $f$ adjacent the outer end of the other plate, the fabric being apertured at $g$ $h$ where it extends across the slots H. This fabric serves the additional function of protecting the edges M' $M^2$ and also coöperates therewith to provide exceedingly stiff and somewhat elongated feather edges $M^3$ $M^4$. Although the edges $M^3$ $M^4$ have sufficient stiffness to maintain their shape, so as to readily move up and down between the plates and the pneumatic tube during radial movement of the tread section, nevertheless as they are formed of fabric, these edges will not tend to cut into or otherwise injure the tube E.

As before stated, the slots H are elongated, but as the distance between the outer ends of these slots is greater than the distance between the inner ends—these distances being represented respectively by the lines $a$ and $b$—provision is made to avoid wedging of the greater length of material represented by the line $a$ between adjacent bolts upon the inward movement of the tread section. This is accomplished by diverging the sides of the slots from the inner ends thereof so that the distance between the slot sides at the point of farthest outward travel of the bolt in the slot—represented by the line $c$—is equal to the distance between the sides at the inner end—indicated by the line $d$—while the circumferential spacing of the bolts is such as to be substantially equal to the length of the section of the tread in contact with the road.

Normally the bolts are at the inner end of the slots and the inner end of each slot is of a size to just receive the bolt without binding, so as to prevent creeping of the tread section. Therefore, when a load is placed upon the wheel there can be no circumferential or vertical movement of the tread section except at the bottom of the wheel where the tread section is moved inwardly. Upon compression of the portion of the tread in engagement with the ground such portion is free to move inwardly, since there is no binding between the slotted portions and the bolts, and the sides of the tread section are in free sliding contact with the cheek plates, while the latter are rigidly clamped in fixed spaced relation. Such an arrangement not only reduces the relative movement between the tread section and the plates to a minimum—minimizing wear between these parts—but also allows the load pressure to be directly transmitted to the pneumatic tube, thereby providing the resiliency of a pneumatic tire. Any tendency to lengthen the remainder of the circumference of the tread portion proper, due to the deflection of the portion in engagement with the ground, is taken care of by compression of the tread section, since the latter is formed of solid rubber or like compressible substance.

It is necessary to have the inwardly-extending portions of the outer edges of the plates so shaped as not to cut into the tread portion F'. To this end the abutment S is slightly rounding on its inner face as shown, and the extreme edge W is also rounding, while the inwardly-extending portions of the cheek plates are arranged at an obtuse angle to the latter. The tread portion proper is slightly tapered and the angle of the inwardly-extending portions of the cheek plates is such as to not only maintain the edges of the plates at all times in contact, so as to form a water and dust proof joint with the tread portion proper, but also to cause the space between the cheek plates immediately adjacent the abutment S to be filled by the tread portion in all positions of radial adjustment of the latter—see Fig. 3—thereby further insuring against leakage between the plates and the tread section. Similarly a liquid tight joint is formed at the inner ends of the plates. Thus the plates have their inner edges rebent to form V-shaped portions $A^2$ for receiving clamping rings $B^2$ which are forced into engagement with the V-shaped portions by means of side plates $C^2$ arranged upon opposite sides of the felly and clamped against the plates through the medium of bolts $D^2$. When clamped in position the bend $E^2$ of the V-shaped portions tightly abut and a water proof joint is formed between the remaining parts because of the clamping action thereupon.

What I claim as my invention is:

1. In a tire, the combination of a housing having a base forming a seat for a pneumatic tire, said housing including spaced metallic cheek plates provided with parallel sides straight to adjacent their outer edges, the outer edges extending inwardly at an obtuse angle to the straight portions of the plates forming abutments, a tread section composed of a portion positioned within the housing having sides parallel to and in free sliding contact with the straight sides of the plates, and a tread proper projecting without the housing having a portion of reduced cross-section providing shoulders, the latter being arranged within and engaging the abutments, the inner face of the tread portion being curved and having sides tapering to comparatively thin edges, forming with the base a chamber for the pneumatic tube having the wall thereof continuous in all positions of radial adjustment of the tread section, a pneumatic tube arranged within the chamber and completely filling the same in all positions of radial adjustment of the tread section, a plurality of circumferentially spaced members extending laterally of the housing sides adjacent their outer ends for clamping the plates in rigid spaced relation, said tread section having elongated slots extending transversely therethrough, said circumferentially spaced members each being of a size to fit, and being normally positioned at the inner ends of the slots, and said shoulders and abutments serving to limit the outward movement of the tread section, preventing any material outward pressure being transmitted to the clamping members.

2. In a tire, the combination of a housing having a base forming a seat for a pneumatic tire, said housing including spaced metallic cheek plates providing a base, said cheek plates beyond the base having parallel sides straight to adjacent their outer edges, the outer edges extending inwardly at an obtuse angle to the straight portions of the cheek plates forming abutments, a tread section composed of a portion having the sides parallel to the straight sides of the plates, and a tread proper projecting without the housing having a portion of reduced cross-section providing shoulders, the latter being arranged within and engaging the abutments, the inner face of the tread portion being curved and provided with sides tapering to comparatively thin edges, forming with the base a chamber for the pneumatic tube having the wall thereof continuous in all positions of radial adjustment of the tread section, a pneumatic tube arranged within the chamber and completely filling the same in all positions of radial adjustment of the tread section, a lubricating fabric attached to the tread section extending along each side thereof intermediate the latter and the cheek plates from adjacent the outer edges of said cheek plates inwardly around the tapering side edges of said tread section and across the curved inner face of the tread portion, forming with the tapering side edges comparatively thin feather edges, said fabric being in free sliding contact with the sides of the plates, a plurality of circumferentially spaced members extending laterally of the housing sides adjacent their outer ends for clamping the plates in rigid spaced relation, said tread section having elongated slots extending transversely therethrough, said circumferentially spaced members each being of a size to fit, and being normally positioned at the inner ends of the slots, and said shoulders and abutments serving to limit the outward movement of the tread section, preventing any material outward pressure being transmitted to the clamping members.

In testimony whereof I affix my signature in presence of two witnesses.

EUGENE W. WILSON.

Witnesses:
 Wm. J. Belknap,
 James P. Barry.